United States Patent [19]

Carlson

[11] Patent Number: 5,007,513

[45] Date of Patent: Apr. 16, 1991

[54] ELECTROACTIVE FLUID TORQUE TRANSMISSION APPARATUS WITH FERROFLUID SEAL

[75] Inventor: J. David Carlson, Cary, N.C.

[73] Assignee: Lord Corporation, Erie, Pa.

[21] Appl. No.: 503,831

[22] Filed: Apr. 3, 1990

[51] Int. Cl.⁵ .................. F16D 37/02; F16J 15/40

[52] U.S. Cl. .................... 192/21.5; 277/80; 277/135; 252/62.52

[58] Field of Search ............ 192/21.5; 277/80, 135; 252/62.52

[56] References Cited

U.S. PATENT DOCUMENTS

| | | | |
|---|---|---|---|
| 2,713,927 | 7/1955 | Rabinow | 192/21.5 |
| 2,718,946 | 9/1955 | Winther | 192/21.5 |
| 2,863,538 | 12/1958 | Jaeschke | 192/21.5 |
| 2,886,151 | 5/1959 | Winslow | 192/21.5 |
| 2,948,371 | 8/1960 | Lehde | 192/21.5 X |
| 2,974,981 | 3/1961 | Vervest et al. | 277/80 |
| 2,987,153 | 6/1961 | Perry | 192/21.5 |
| 3,047,507 | 7/1962 | Winslow | 252/75 |
| 3,254,745 | 6/1966 | Isakov et al. | 192/21.5 |
| 3,255,853 | 6/1966 | Klass et al. | 192/21.5 |
| 3,620,584 | 11/1971 | Rosenweig | 277/80 X |
| 3,917,538 | 11/1975 | Rosenweig | 252/62.51 |
| 4,171,818 | 10/1979 | Moskowitz et al. | 277/80 |
| 4,200,296 | 4/1980 | Stahl et al. | 277/80 |
| 4,340,233 | 7/1982 | Yamamura et al. | 277/1 |
| 4,357,021 | 11/1982 | Raj et al. | 277/1 |
| 4,357,022 | 11/1982 | Raj | 277/1 |
| 4,357,023 | 11/1982 | Yamamura | 277/1 |
| 4,357,024 | 11/1982 | Raj | 277/1 |
| 4,407,508 | 10/1983 | Raj et al. | 277/1 |
| 4,407,518 | 10/1983 | Moskowitz et al. | 277/1 |
| 4,478,424 | 10/1984 | Raj | 277/80 |
| 4,526,379 | 7/1985 | Raj | 277/80 |
| 4,526,380 | 7/1985 | Raj et al. | 277/80 |
| 4,526,382 | 7/1985 | Raj et al. | 277/80 |
| 4,526,484 | 7/1985 | Stahl et al. | 384/133 |
| 4,527,805 | 7/1985 | Gowda et al. | 277/80 |
| 4,531,846 | 7/1985 | Raj | 384/478 |
| 4,545,587 | 10/1985 | Higgins | 277/80 |
| 4,575,102 | 3/1986 | Raj et al. | 277/80 |
| 4,575,103 | 3/1986 | Pedu | 277/80 |
| 4,628,384 | 12/1986 | Raj et al. | 277/80 X |
| 4,630,943 | 12/1986 | Stahl et al. | 384/133 |
| 4,692,826 | 9/1987 | Raj et al. | 277/80 X |
| 4,694,213 | 9/1987 | Gowda et al. | 310/90 |
| 4,772,032 | 9/1988 | Raj et al. | 277/80 |
| 4,772,407 | 9/1988 | Carlson | 252/74 |

OTHER PUBLICATIONS

Ferrofluidics Corporation, "Solving Vacuum Feedthrough Problems with Ferrofluidic Seals", pp. 1, 6 and 24, 1978.

Kaiser, R. and Miskolczy, G., "Magnetic Properties of Stable Dispersions of Subdomain Magnetite Particles", J. Appl. Phys., vol. 41, pp. 1064–1072.

Moskowitz, R., "Designing with Ferrofluids", Mechanical Engineering, pp. 30–36 (Feb. 1975); originally Designing with Ferromagnetic Fluids from the Design Engineering Division of the ASME (1974).

Popplewell, J., "Technological Applications of Ferrofluids", Phys. Technol., vol. 15, pp. 150–156 (1984).

Rosenweig, R. E., "Magnetic Fluids", Sci. Am., vol. 247, No. 4, 114–132 (1982).

Primary Examiner—Richard Lorence
Attorney, Agent, or Firm—David L. McCombs; W. Graham Buie

[57] ABSTRACT

An apparatus for controlling the transmission of torque between drive elements using an electroactive fluid which is sealed within an enclosed chamber. A housing defines the chamber and includes at least one end defining an opening. Spaced electrodes are provided in the chamber in contact with the fluid and are respectively connected to the drive elements. A controllable power source applies a variable electric field to the fluid such that force is transmitted between the electrodes by the fluid according to the strength of the field. A shaft connects one of the electrodes to one of the elements and extends through the opening. A ferrofluid seal assembly prevents leakage of the fluid from the chamber through the opening. The assembly defines with the shaft an annular space in communication with the fluid. A magnetic circuit is provided in the assembly by a permanent magnet for applying a concentrated magnetic field in one or more regions across the annular space. A ferrofluid which is immiscible with the electroactive fluid occupies the regions as though it were a liquid O-ring, thus sealing the fluid within the chamber both when the shaft is stationary and when rotating.

24 Claims, 3 Drawing Sheets

ELECTROACTIVE FLUID TORQUE TRANSMISSION APPARATUS WITH FERROFLUID SEAL

FIELD OF THE INVENTION

The present invention relates in general to a torque transmission and conversion apparatus using an electroactive fluid. More specifically, the present invention provides a torque transmission and conversion apparatus of the above type having a ferrofluid seal.

BACKGROUND OF THE INVENTION

Significant progress has been made in the development of low cost, reliable electroactive fluids. Generally, electroactive fluids consist of suspensions of very fine particles in a dielectric liquid media. Electroactive fluids experience changes in their physical properties in the presence of an electric field, and for this reason are useful in a wide variety of mechanical treatments.

One type of electroactive fluid is an electrorheological or "electroviscous" fluid. For example, see Carlson, U.S. Pat. No. 4,772,407. Electrorheological fluids are electroactive fluids which, in the absence of an electric field, exhibit Newtonian flow characteristics such that their shear rate is approximately proportional to shear stress. However, when an electric field on the order of $10^3$ V/mm is applied, a yield/stress phenomenon occurs such that no shearing takes place until the shear stress exceeds a yield value which rises with increasing electric field strength. The result can appear as an increase in apparent viscosity of several orders of magnitude.

Another type of electroactive fluid is an electrophoretic or "electroseparatable" fluid. Electrophoretic fluids are described in Klass, et al., U.S. Pat. No. 3,255,853; and in Carlson, U.S. patent application Ser. No. 463,245, assigned to the assignee of the present invention. Electrophoretic fluids are suspensions similar to electrorheological fluids but are characterized by a very different response to an applied electric field. The particles within electrophoretic fluids exhibit a very strong electrophoretic migration. Rather than forming, in the presence of an electric field, a fibrillated structure that has an induced yield strength, electrophoretic fluids separate into particle-rich and particle deficient phases by electrophoresis. Generally, the electrophoretic induced separation may be accomplished and maintained at much lower electric fields, since electrophoresis is a linear phenomenon with respect to electric field strength; while in contrast, the strength of an electrorheological fluid varies with the square of the electric field because of the dependence on induced dipole interactions for the electrorheological effect.

Many commercially realizable systems employing electroactive fluids have been developed which include torque transmission and conversion devices such as variable clutch, brake and differential assemblies. See Winslow, U.S. Pat. No. 2,886,151 and Klass, et al., U.S. Pat. No. 3,255,853. Assemblies of this type are well known and offer the possibility of progressive and continuous control of torque in response to variation in the electric field applied to the electroactive fluid.

However, a common problem associated with electroactive fluid assemblies is containment of the electroactive fluid where a rotary shaft must pass through a seal into a region filled with the fluid. The leakage of fluid is difficult to prevent particularly for systems operating under conditions of prolonged vibration, impact, heat and under other adverse conditions. Conventional dynamic fluid seals are not well suited to this application since the particles (the particulate phase) of electroactive fluids may be rather course and abrasive. Temperature and pressure extremes experienced by the contained fluid, even under normal operating conditions, further may reduce the effectiveness of the seal causing fluid leakage. Loss of electroactive fluid through a dynamic fluid seal in such systems is especially undesirable since voids in the fluid containment region may cause electrical arcing or high voltage breakdown which adversely affect system performance and which also may lead to system failure. Further, leakage of the electroactive fluid liquid media (the liquid phase), but not the particulate phase, can have deleterious effects on the fluid rheology, resulting in sedimentation and caking of the particulate phase.

Rotary-shaft seals employing a ferrofluid in a magnetic circuit have been developed for inert gas or vacuum seal applications which are designed to withstand significant pressure differences under static, as well as dynamic, conditions.

Ferrofluids are permanent, colloidal suspensions of ferromagnetic particles such as magnetite or $Fe_3O_2$ in various carrier solvents with added stabilizers which prevent agglomeration of the particles. Ferrofluids are described in the publication of R. Rosensweig, "Magnetic Fluids," *Scientific American*, Vol. 243, pp. 114-132, October 1982; and in Rosensweig, U.S. Pat. No. 3,917,538. Unlike the coarse magnetic particle suspensions used in the non-Newtonian magnetic clutch fluids of the 1940's, the particles of ferrofluids are sufficiently small (approximately 100 angstroms in diameter) that they are retained in suspension by Brownian motion forces. Further, because of their size, they do not exhibit a Bingham type yield stress behavior and congeal into a solid mass when a magnetic field is applied, but instead remain as a homogeneous liquid. When a magnetic field is applied to a ferrofluid, a body force is developed which is simply a force that acts throughout a given volume of the fluid. The body force developed depends on the gradient of the magnetic field and the magnetization value of the ferrofluid and causes it to occupy the region or regions of highest magnetic field.

A multistage, rotary-shaft ferrofluid seal is shown, for example, in Rosensweig, U.S. Pat. No. 3,620,584. The seal includes a magnetic circuit consisting of a permanent magnet and pole pieces to provide a focussed magnetic field. The ferrofluid thereby experiences a body force sufficient to entrain discrete, ferrofluid liquid O-rings in each annular stage of the seal.

However, ferrofluid seal assemblies have heretofore not been recommended for use in sealing liquids under pressure since many liquids tend to be reactive or miscible with the ferrofluid resulting in flocculation, leakage and other problems. Furthermore, ferrofluids are not well suited for use in sealing arrangements that involve particles in a packing mode since the particles will collect in the region of the seal so as to interfere with seal integrity.

In view of the foregoing, there is a need for an electroactive fluid torque transmission and conversion apparatus which successfully incorporates a ferrofluid seal for improved containment of the electroactive fluid.

SUMMARY OF THE INVENTION

It is therefore an object of the present invention to provide an improved torque transmission and conversion apparatus which utilizes an electroactive fluid.

It is a further object of the present invention to provide an apparatus of the above type in which an electric field is applied to the electroactive fluid to control engagement between electrodes for sustaining forces or torques between members to be coupled.

It is a still further object of the present invention to provide an apparatus of the above type in which &he electroactive fluid is confined within a housing and at least one ferrofluid seal is provided to prevent leakage of the electroactive fluid from the housing.

It is a still further object of the present invention to provide an apparatus of the above type in which the ferrofluid seal operates in conjunction with a rotary shaft extending from the housing.

It is a still further object of the present invention to provide a apparatus of the above type in which the ferrofluid and the electroactive fluid are immiscible.

It is a still further object of the present invention to provide an apparatus of the above type in which the particulate phase of the electroactive fluid is prevented from collecting and jamming against the ferrofluid seal.

Toward the fulfillment of these and other objects, a torque transmission and conversion apparatus is provided which is controlled by the application of an electric field to an electroactive fluid. The apparatus may be configured as a clutch, brake, differential, pump or other rotary force transmitting assembly and includes cooperable electrodes which are connected respectively to relatively movable members or drive elements.

A housing defines a chamber for containing the electroactive fluid, which includes a particulate phase and a liquid phase, in the space between the electrodes. At least one opening is also defined in the housing for receiving a rotary shaft to connect one of the electrodes to one of the drive elements. A power source provides a controllable voltage potential between the electrodes for applying the electric field to the electroactive fluid. Torque is transmitted between the electrodes, and thus the drive elements, by the electroactive fluid according to the strength of the electric field.

A ferrofluid seal assembly is provided to seal the electroactive fluid in the chamber. The seal assembly defines an annular space with the shaft in communication with the fluid in the chamber. A magnetic circuit is established in the assembly by a permanent magnet for providing a concentrated magnetic field in one or more regions across the annular space. A ferrofluid occupies the one or more regions in response to the magnetic field to provide one or more corresponding liquid O-ring seals, thus isolating the electroactive fluid within the chamber, both when the shaft is stationary and when it is rotating. The ferrofluid and the electroactive fluid are immiscible.

In order to prevent the particulate phase of the electroactive fluid from collecting in the opening near the seal assembly and being forced against the ferrofluid, the end of the housing defining the opening may be beveled inwardly from the chamber to increase the fluid shear adjacent the ferrofluid to thus force the particulate phase away from the ferrofluid and into the chamber. Similarly, the end of the electrode adjacent the opening may be tapered to increase the fluid shear between the electrode and the end of the housing near the opening, so that the particulate phase will not collect near the opening.

BRIEF DESCRIPTION OF THE DRAWINGS

The above brief description, as well as further objects features and advantages of the present invention will be more fully appreciated by reference to the following detailed description of the presently preferred but nonetheless illustrative embodiments in accordance with the present invention, when taken in conjunction with the accompanying drawings, wherein.

DESCRIPTION OF THE PREFERRED EMBODIMENT

Figure 1:
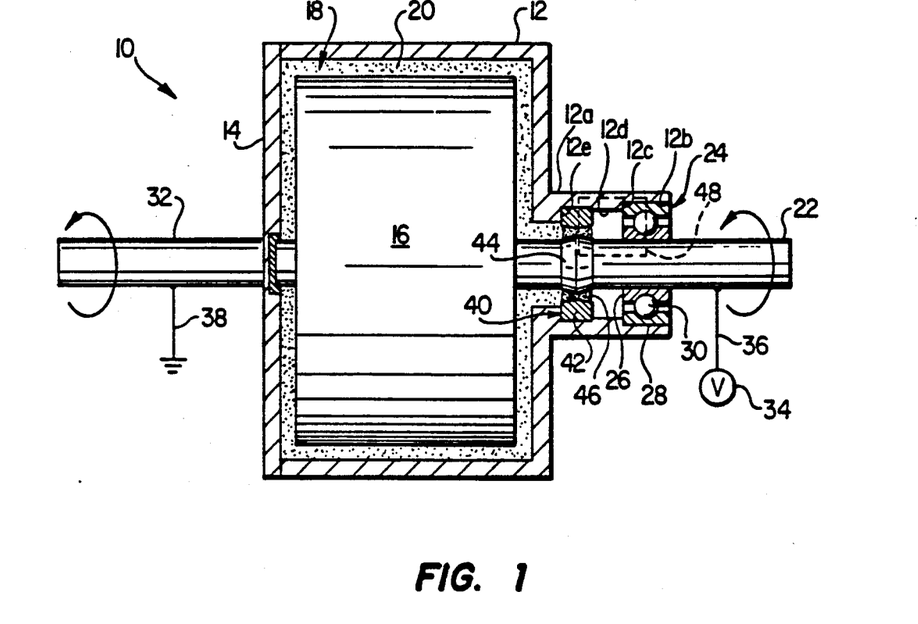
FIG. 1 is a side elevational view, partial sectional view, depicting the torque transmission and conversion apparatus of the present invention.

Referring to FIG. 1 of the drawings, the reference numeral 10 refers to a clutch or similar device for the transmission and conversion of torque which may be used, for example, as a torque coupling device, brake, locking or disengagement device in a wide variety of applications. The clutch 10 includes a cylindrical housing 12 having an open ended, reduced diameter portion 12a, an end plate 14 and an inner, cylindrical rotor 16. The housing 12 also includes within the portion 12a, a counterbore 12b which defines an inner shoulder 12c, and a counterbore 12d which defines an inner shoulder 12e, for reasons to be described.

An enclosed chamber 18 is defined by the housing 12 which contains the rotor 16 and an electroactive fluid in the space between the rotor and the housing. The electroactive fluid, subsequently discussed in detail, is represented by a dispersion of particles 20, as shown. A drive shaft 22 is connected to the rotor 16 and extends through the open end of the housing portion 12a. A bearing assembly, generally designated by the reference numeral 24, supports the shaft 22 in the housing portion 12a for rotational motion of the shaft and the rotor 16 with respect to the housing 12. Inner and outer races 26, 28 of the assembly 24 engage the shaft 22 and the counterbore 12b, respectively. The races 26, 28 should be electrically insulated from the shaft 22 and this may be accomplished by providing a thin layer of insulating material such as a polymeric film between the respective races 26, 28 and the shaft 22. Alternatively, the races 26, 28 may be constructed of an electrically non-conductive, yet magnetically permeable material, for reasons to be discussed later. A plurality of ball bearings 30 are provided between the races 26, 28 which allow them to rotate relative to each other with reduced friction. The assembly 24 abuts the shoulder 12c and is held in the counterbore 12b by a retaining ring (not shown) fitted around the shaft 22 and against the assembly. An insulating member 31 supports the shaft 22 relative to the end plate 14 to prevent the rotor 16 from wobbling.

A drive shaft 32 is connected to the end plate 14 in coaxial alignment with the shaft 22. Although not shown, it is understood that the end plate 14 is connected to the housing 12 in a suitable, leak proof manner. The shafts 22, 32 each may operate as input or output drive shafts, according to the particular application, as will be discussed later.

A power source 34 is connected by wires 36, 38 to the drive shafts 22, 32, respectively. The drive shafts 22, 32, the housing 12 and the rotor 16 are constructed of an electrically conductive material so that a voltage potential may be developed between the housing and the rotor. In this manner, the housing 12 and the rotor 16 function as electrodes and provide an electric field across the electroactive fluid in the space therebetween, for reasons to be described. In the preferred embodiment, the housing 12 is grounded and the rotor 16 is at either at a positive or negative high voltage with respect to the housing, as determined by the power source 34.

According to a feature of the invention, a ferrofluid seal assembly, designated generally by the reference numeral 40, is provided within the housing portion 12a and functions to seal the fluid within the chamber 18 while permitting rotational motion of the shaft 22 relative to the housing portion, as well be discussed. To this end, a radially polarized, annular permanent magnet 42 extends in the counterbore 12d thus encircling the shaft 22 in a spaced relationship from the shaft. The magnet 42 is press fit into the counterbore 12d and abuts the inner shoulder 12e. A collar 44 encircles the shaft 22 in the same transverse plane as the magnet 42. The outer periphery of the collar 44 is tapered so as to decrease its radial thickness in either direction axially from its middle. Accordingly, an annular space is defined between the magnet 42 and the collar 44 which is relatively narrow at the middle of the collar and gradually increases in radial thickness in either direction axially from the middle.

A ferrofluid, represented by a concentration of particles 46, fills the annular space between the magnet 42 and the collar 44 as though it were a liquid O-ring or liquid lip seal in contact with the electroactive fluid, for reasons later described in detail. The ferrofluid seal thus functions both as an exclusion seal to prevent contamination of the fluid in the chamber 18 by dirt, gas or other foreign material, and also as an inclusion seal to prevent leakage of the fluid from the chamber through the annular space defined between the shaft 22 and the housing portion 12a.

Importantly, the ferrofluid and the electroactive fluid are immiscible and nonreactive so that the particulate phase of either fluid will not flocculate or come out of suspension when in contact with the other. The liquid phase of the electroactive fluid is thus also prevented from "bleeding" through the ferrofluid along the surface of the shaft 22.

In the preferred embodiment, the electroactive fluid is an electrorheological fluid comprising a suspension of electrically polarizable particles in a perfluorinated polyether liquid. The particles of electrorheological fluid can essentially be any particles previously utilized in electrorheological fluids known in the art and described in U.S. Pat. No. 3,047,507, for example. Preferably, the particles of the electrorheological fluid have a diameter of between about 1 and 10 microns. The perfluorinated polyether liquid is available under the trade name GALDEN from Montedison, Inc.

The ferrofluid is preferably a mixture of a synthetic diester liquid, an oil soluble dispersant and colloidal-sized magnetic particles dispersed in the solution. The dispersant is typically a polyisobutene, succinic acid derivative and the magnetic particles typically are magnetite. A suitable ferrofluid is available under the trade reference APG-513A from Ferrofluidics Corporation.

Other immiscible electroactive fluid and ferrofluid combinations are also contemplated. For example, an electroactive fluid having a diester or polydimethylsiloxane liquid phase may be used with a ferrofluid having a perfluorinated polyether liquid phase.

It is understood that the bearing assembly 24, the shaft 22 and the collar 44 are magnetically permeable so that in conjunction with the magnet 42, a magnetic circuit is established in the seal assembly 40 which is represented schematically in the drawing by the flu lines 48. The magnetic circuit provides a concentrated magnetic field across the annular space directly between the magnet 42 and the collar 44. The magnetic field strength, or flux density, provided by the magnetic circuit increases as the annular space narrows approaching the transverse plane defined by the middle of the collar 44. A body force is imposed on the ferrofluid by the concentrated magnetic field which directs it to the region of greatest flux density, i.e., the annular space between the magnet 42 and the collar 44 and, more specifically, the narrow portion of the annular space in the transverse plane defined by the middle of the collar. The ferrofluid seal is retained in place by the magnetic field and has a pressure capacity determined by the magnitude of the body force imposed on the ferrofluid.

During operation, the drive shafts 22, 32 of the clutch 10 are connected to relatively movable members or drive elements (not shown). The drive elements each either transmit or receive, or alternatively transmit and receive rotary mechanical forces, depending upon the application. Since the shafts 22, 32 are connected respectively to the rotor 16 and the housing 12, the transmission of torque between the drive elements is regulated by control of the mechanical coupling between the rotor and the housing by the electroactive fluid.

When it is desired to operate the clutch 10 with the drive elements uncoupled and thus rotating relatively freely with respect to each other, the power source 34 is deactivated so that no voltage potential is provided between the housing 12 and the rotor 16, and thus no electric field is applied to the electroactive in the chamber 18. In the absence of an electric field, the electroactive fluid exists as a low viscosity, homogeneous suspension of the particles 20, so that the housing 12 and the rotor 16 are thus relatively uncoupled. The viscous "drag" provided by the fluid may be kept to a minimum by using a low zero-field viscosity fluid.

In order to transmit torque between the drive elements, the power source 34 is activated to provide a voltage potential between the housing 12 and the rotor 16 so that an electric field is applied to the fluid within the chamber 18. In the presence of the electric field, the fluid solidifies, or develops a yield strength, thereby engaging the confronting surfaces of the housing 12 and the rotor 16. The housing 12 and the rotor 16 are thus coupled and capable of transmitting torque between the shafts 22, 32 and thus the respective drive elements. It is understood that the magnitude of the electric field generated by the power source 34 may be regulated to control the yield strength of the fluid and thus the transmission and conversion of torque between the drive elements.

The magnetic circuit of the ferrofluid seal assembly 40 is continuously maintained by the permanent magnet 42 and completed by the shaft 22 and the bearing assembly 24, whether the shaft 22 is stationary, or rotating with respect to the housing 12. The ferrofluid is thus at all times confined to the narrow portion of the annular space to provide its sealing function. The integrity of the seal is also maintained notwithstanding run-out and eccentricity of the shaft 22 during its rotation because the ferrofluid maintains its liquid properties even when confined in the presence of the concentrated magnetic field.

Figure 2:
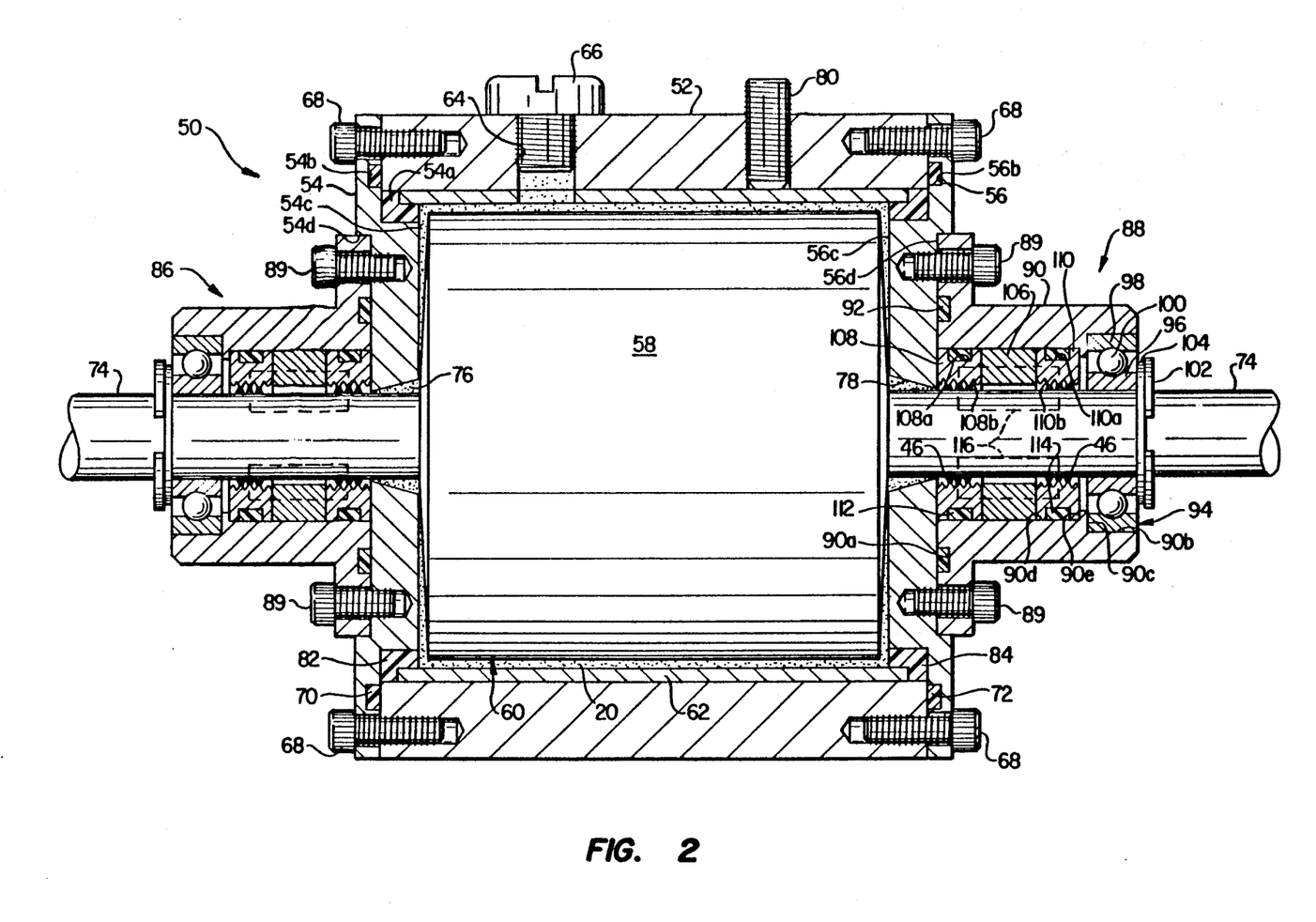
FIG. 2 is a side elevational view, partial sectional view, depicting another embodiment of the torque transmission and conversion apparatus of the present invention.

Referring now to FIG. 2 of the drawings, the reference numeral 50 refers to an alternative clutch or similar device for the transmission and conversion of torque which may be used, for example, as a torque coupling device, brake, locking or disengagement device. The clutch 50 includes an open ended, cylindrical housing 52, opposing end plates 54, 56 and an axially disposed, cylindrical rotor 58. Although not shown in the drawings, it is understood that the clutch 50 may be supported in a suitable manner and connected to relatively movable members or drive elements (also not shown) for the transmission of torque therebetween, as will be discussed later.

An enclosed chamber 60 is defined by the housing 52 and the end plates 54, 56 for containing the rotor 58 and an electroactive fluid in the space between the rotor and the housing. The electroactive fluid is described with reference to the previous embodiment and is schematically represented by the particles 20. A tube member 62 engages the inner diameter surface of the housing 52 in surface contact with the fluid, for reasons to be described. A fluid port 64 is defined by aligned openings in the housing 52 and the member 62 for passing the electroactive fluid into and out of the chamber 60. A threaded cap 66 engages the fluid port 64 to provide a removable cover for the fluid port.

Outer shoulders 54a, 56a form the periphery of the respective end plates 54, 56, for engaging the opposing ends of the housing 52. A plurality of threaded fasteners 68 extend through corresponding openings formed in the shoulders 54a, 56a and into corresponding bores in the ends of the housing 52 thus removably securing the end plates 54, 56 to the housing. Grooves 54b, 56b are also milled in the respective shoulders 54a, 56a. O-ring seals 70, 72 are received in the respective grooves for effectively sealing the confronting surfaces of the shoulders 54a, 56a and the opposing ends of the housing 52. Reduced-diameter portions 54c, 56c and counterbores 54d, 56d are also included in the respective end plates 54, 56. The diameter of the portions 54c, 56c is slightly less than the inner diameter of the housing 52, for reasons to be discussed. The function of the reduced-diameter portions 54c, 56c and counterbores 54d, 56d will be described later in detail.

A rotary shaft 74 is operatively connected to the rotor 58 along its longitudinal axis and is further connected at either or both ends thereof to one or more drive elements (not shown). Openings 76, 78 are formed in the respective end plates 54, 56 for receiving the shaft 74 as it extends outwardly in both directions from the chamber 60. The openings 76, 78 are beveled so as to possess an increasing diameter in a direction toward the chamber 60, for reasons to be subsequently described. The opposing ends of the rotor 58 are spaced slightly from the end plates 54, 56 and are tapered radially outwardly from the shaft 74 so that the space occupied by the fluid between the rotor and the end plates becomes axially greater in the axial dimension radially outwardly from the shaft, for reasons also to be described later.

A high voltage lead 80 threadingly engages a corresponding opening in the housing 52 to make contact with the member 62. A power source (not shown) is connected by suitable wiring (also now shown) to the lead 80 and also to the shaft 74. It is understood that the ground connection can be made to the shaft 74, to either end plate assembly 54, 56 or to the ferrofluid seal housings 86, 88 since all of these components are in contact electrically via the ball bearings 94. The rotor 58, the member 62, the shaft 74 and the lead 80 are constructed of an electrically conductive material so that a voltage potential may be developed between the rotor and the member by the power source. In this manner, the rotor 58 and the member 62 function as electrodes and provide an electric field across the electroactive fluid in the chamber 60, for reasons to be discussed. In the preferred embodiment, the rotor 58 is grounded and the tube member 62 is at either a positive or negative high voltage with respect to the rotor, as determined by the power source.

It is understood that the housing 52 is constructed of an electrically nonconductive material to prevent shock and electrical arcing between the electrically conductive components just described. Insulating rings 82, 84 secure the tube member 62 in place against the inner surface of the housing 52 and insulate the member electrically from the respective end plates 54, 56. The rings 82, 84 occupy the annular space between the respective reduced-diameter portions 54c, 56c and the inner wall of the housing 52, and are supported in place by the respective shoulders 54a, 56a and the reduced diameter portions.

Two ferrofluid seal assemblies, referred to generally in FIG. 2 by the reference numerals 86 and 88, are provided which isolate the electroactive fluid within the chamber 60 while permitting rotational motion of the shaft 74 relative to the housing 52, as will be discussed. The seal assemblies 86, 88 are received in the respective counterbores 54d, 56d for their proper alignment relative to the shaft 74 and the respective end plates 54, 56, and are removably secured to the end plates by threaded fasteners 89 which extend through corresponding openings in the assemblies and into corresponding bores in the end plates. Since the seal assemblies 86, 88 are substantially the same only the seal assembly 88 will be described in detail.

Figure 3:
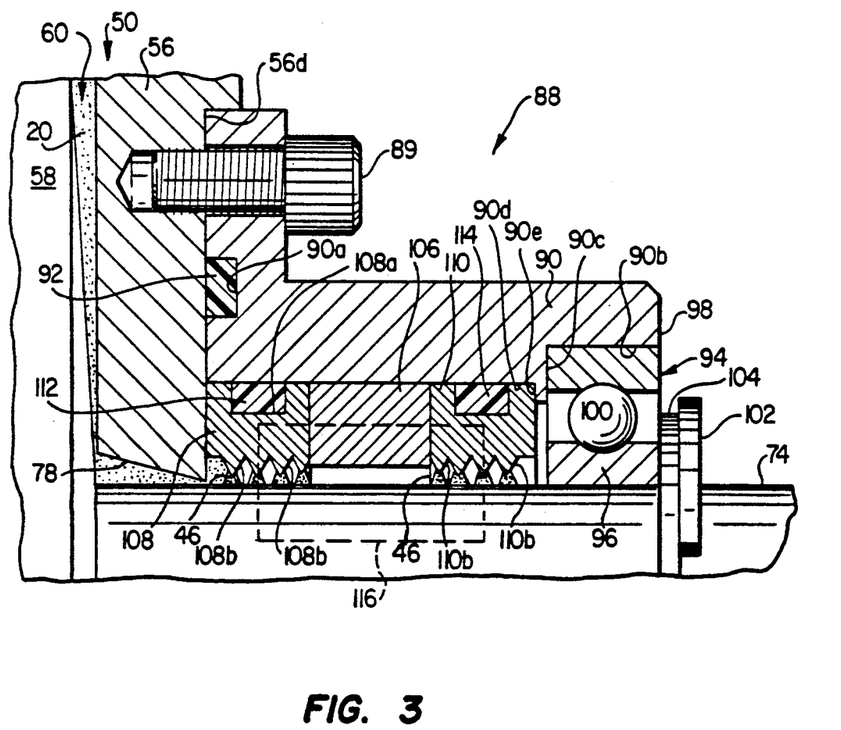
FIG. 3 is an enlarged, partially broken away, radial half-sectional view of one of the ferrofluid seal assemblies of the apparatus of FIG. 2.

Referring now also to FIG. 3, the seal assembly 88 includes a housing 90 having an annular groove 90a milled therein, a first counterbore 90b defining a first inner shoulder 90c, and a second counterbore 90d defining a second inner shoulder 90e, for reasons to be described.

An O-ring seal 92 extends in the groove 90a for engaging the confronting surfaces of the end plate 56 and the housing 90 in a sealing relationship.

A bearing assembly 94 is press fit into the counterbore 90b against the inner shoulder 90c and supports the shaft 74 for rotational motion with respect to the housing 52 and the housing 90. The assembly 94 includes an inner race 96 circumscribing the shaft 74 and an outer race 98 extending in the counterbore 90b. A plurality of ball bearings 100 are provided between the races. A retaining ring 102 engages the shaft 74 and holds the assembly 94 in place against the shoulder 90c. A laminated shim 104 is disposed between the assembly 94 and the ring 102 for reducing the frictional forces therebetween and ensuring proper end-to-end positioning of the rotor 58 within the housing 52 during rotation of the shaft 74.

An axially polarized, annular-permanent magnet 106 extends in the counterbore 90d in a spaced relationship from the shaft 74. Annular pole pieces 108, 110 also extend in the counterbore 90d coaxially with the magnet 106 and engage the ends of the magnet, respectively, with the pole piece 108 abutting the wall of the end plate 56 and the pole piece 110 abutting the shoulder 90e. Grooves 108a, 110a are milled, respectively, in the outer diameter surfaces of the pole pieces 108, 110. Elastomeric seal rings 112, 114 extend, respectively, in the grooves 108a, 110a to engage the confronting surfaces of the counterbore 90d and the pole pieces 108, 110 in a sealing relationship.

A plurality of triangular shaped, annular teeth 108b, 110b are formed along the inner diameter surface of the respective pole pieces 108, 110 thus providing corresponding regions in which the annular space between the shaft 74 and the respective pole pieces is relatively narrow in radial dimension. The regions are separated by gaps in which the annular space between the shaft 74 and the pole pieces 108, 110 is relatively broad in radial dimension. The function of the teeth 108b, 110b is subsequently described.

A ferrofluid, described earlier with reference to the previous embodiment and represented by a concentration of particles 46, fills each of the regions between the shaft 74 and the teeth 108b, 110b as though it were a liquid O-ring or liquid lip ring seal, for the reasons subsequently described. In this manner, the ferrofluid functions as an inclusion seal to prevent leakage of the electroactive fluid from the chamber 60. Since the electroactive fluid and the ferrofluid are immiscible, the liquid phase of the electroactive fluid is also prevented from "bleeding" through the ferrofluid along the shaft 74 and exiting the chamber 60. The ferrofluid also functions as an exclusion seal to prevent dirt, gas or other foreign material from entering the chamber 60.

It is understood that the shaft 74 and pole pieces 108, 110 are magnetically permeable so that in conjunction with the magnet 106, a magnetic circuit is established in the assembly 88. The magnetic circuit is represented by the flux lines 116 and establishes a concentrated magnetic field in the annular space between the shaft 74 and the pole pieces 108, 110. The magnetic field strength, or magnetic flux density, is greatest in the narrow regions between the shaft 74 and the teeth 108b, 110b. The concentrated magnetic field imposes body forces on the ferrofluid causing it to move and occupy the areas of greatest flux density, i.e., the regions between the shaft 74 and the teeth 108b, 110b.

In operation, the housing 52 is attached, for example, to a stationary, primary element (not shown). Secondary elements (also not shown) which are rotatable or otherwise movable relative to the primary element are connected, respectively, to the ends of the shaft 74 in a suitable manner. The primary and secondary elements either transmit or receive, or alternatively transmit and receive, depending on the application, mechanical forces between each other as regulated by the control of the mechanical coupling between the housing 52 and the rotor 54 by the electroactive fluid in the chamber 60.

When it is desired to operate the assembly such that the drive elements are uncoupled and thus move relatively freely with respect to each other, the power source (not shown) is deactivated so that no voltage potential is provided between the rotor 58 and the member 62, and thus no electric field is applied to the electroactive fluid in the chamber 60. In the absence of an electric field, the electroactive fluid exists as a relatively low viscosity, homogeneous suspension of the particles 18 in the space between the tube and the rotor. Thus, when rotation of the rotor 58 relative to the housing 52 is initiated, the member 62 and the rotor are coupled only to the extent provided the shear strength of the electroactive fluid.

In order to transmit torque between the drive elements, the power source (not shown) is activated to provide a voltage potential between the rotor 58 and the member 62 so that an electric field is applied to the fluid within the chamber 60. In the presence of the electric field, the fluid solidifies, or develops yield strength, thereby engaging the confronting surfaces of the rotor 58 and the member 62. The rotor 58 and the member 62 are thus coupled and capable of transmitting force between the primary and secondary elements. It is understood that the magnitude of the electric field generated by the power source may be regulated to control the yield strength of the fluid and thus the transmission and conversion of force between the drive elements.

The magnetic circuit of the ferrofluid seal assembly 88 is maintained by the magnet 106 and completed by the shaft 74 and the pole pieces 108, 110 both when the shaft is stationary and rotating with respect to the housing 52, thereby maintaining the ferrofluid in the regions between the shaft and the teeth 108b, 110b so as to function as discrete, liquid O-ring seals at all times. The integrity of the seals is maintained notwithstanding run out and eccentricity of the shaft 74 during its rotation because the ferrofluid maintains its liquid properties even when confined in the seal regions by the concentrated magnetic field. Each of the regions having a ferrofluid seal are capable of sustaining a differential pressure capacity such that the seals act in series to provide a total differential pressure seal capacity for the assembly 88. The gaps between regions may be pressurized, if desired, to provide a pressurized type of sealing function.

During rotation of the rotor 58, a reduced shear stress is normally experienced by the electroactive fluid in the chamber 60 close to the opening 78 which can cause a concentration or "packing" of the particulate phase of the fluid in the opening and against the ferrofluid, so as to interfere with the operation of the seal assembly 88. The present invention alleviates the foregoing by changing the shear stress experienced by the fluid in the opening 78 and also in the chamber 60 adjacent to the opening. To this end, the opening 78 is bevelled as previously described to have a diameter which gradually decreases from the inner to the outer walls of the end plate 56. Accordingly, the electroactive fluid experiences an increased shear stress in the reduced diameter portion of the opening 78 immediately adjacent to the outer wall of the end plate 56, which forces the particulate phase inwardly toward the larger diameter portion of the opening adjacent to the inner wall of the end plate, and thus inwardly toward the end of the rotor 58.

As also previously described, the end of the rotor 58 is tapered from the shaft 74 to its radial edge so that the space between the inner wall of the end plate 56 and the end of the rotor increases in axial dimension, radially outwardly from the shaft. Thus, the fluid experiences a decreasing shear stress radially outwardly from the shaft 74 along the end of the rotor 58 so that the particulate phase is forced away from the opening 78 and toward the member 62. It is understood that the slope of the taper in the end of the rotor 58 may be altered so as to merely equalize the shear stress experienced by the fluid radially along the end of the rotor 58, such that the particulate phase of the fluid neither collects in the opening 78 nor is forced toward the member 62.

Figure 4:
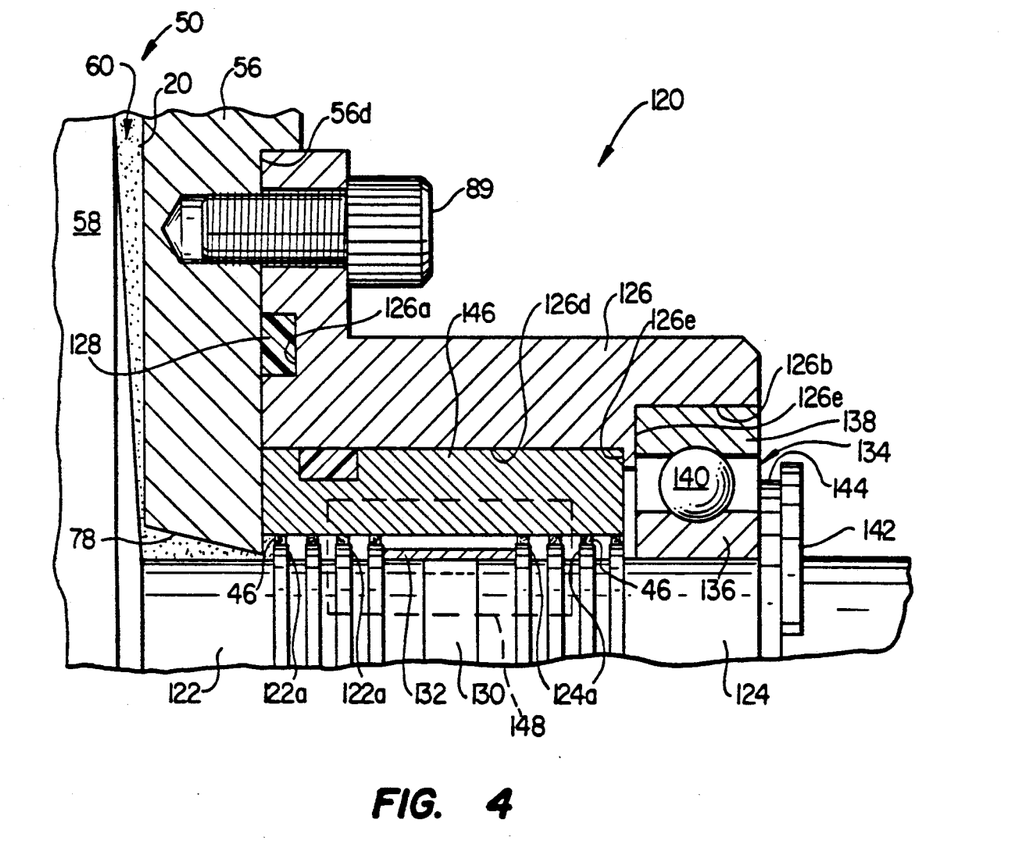
FIG. 4 is an enlarged, partially broken away, radial half-sectional view of another embodiment of one of the ferrofluid seal assemblies of the apparatus of FIG. 2.

Referring now to FIG. 4 of the drawings, an alternative ferrofluid seal assembly, designated generally by the reference numeral 120, is provided for use with the clutch 50 in which the shaft 74 of the clutch is replaced with cooperable shafts 122, 124, as will be described subsequently in detail. The seal assembly 120 includes a housing 126 having an annular groove 126a milled therein, a first counterbore 126b defining a first inner shoulder 126c, and a second inner shoulder 126d defining a second inner shoulder 126e, for reasons to be described.

The housing 126 is received in the counterbore 56d of the clutch 50 for proper alignment relative to the end plate 56, and is removably secured to the end plate by the threaded fasteners 89 which extend through corresponding openings in the housing and into corresponding bores in the end plate.

An O-ring 128 extends in the groove 126a for engaging the confronting surfaces of the end plate 56 and the housing 126 in a sealing relationship.

The shaft 122 is connected to the rotor 58 and extends through the opening 78 of the end plate 56 into the assembly 120. The shaft 124 is coaxially aligned with the shaft 122 and is spaced therefrom. An axially polarized permanent magnet disc 130 is disposed coaxially in the space between the shafts 122, 124 and abuts the facing ends of the shafts, for reasons to be described. A sleeve 132 encircles the ends of the shafts 122, 124 and the disc 130 for mechanically coupling the shafts relative to each other. The sleeve 132 is adhesively bonded, press or shrink-fit, or otherwise suitably fastened to the ends of the shafts 122, 124 so that the shafts will not slip relative to each other during rotary motion thereof.

A bearing assembly 134 is press-fit into the counterbore 126b against the inner shoulder 126c and supports the shaft 124 for rotational motion with respect to the housing 52. The assembly 134 includes an inner race 136 circumscribing the shaft 124 and an outer race 138 extending in the counterbore 126b. A plurality of ball bearings 140 are provided between the races. A retaining ring 142 engages the shaft 124 and holds the assembly 134 in place against the shoulder 126c. A laminated shim 144 is disposed between the assembly 134 and the ring 142 for reducing the frictional forces and ensuring proper axial alignment of the rotor 58 therebetween during rotation of the shaft 124.

An elongate, tubular pole piece 146 extends in the counterbore 126d coaxially with the shafts 122, 124 in a spaced relationship from the shafts. The ends of the pole piece 146 abut the wall of the end plate 56 and shoulder 126e, respectively. An O-ring seal 147 encircles the pole piece 146 to maintain the pole piece in a sealing relationship with the housing 126.

A plurality of rectangular shaped, annular teeth 122a, 124a are formed along the outer diameter surface of the respective shafts 122, 124 thus providing corresponding regions in which the annular space between the shafts and the pole piece 146 is relatively narrow in radial dimension. The regions are separated by gaps in which the annular space between the shafts 122, 124 and the pole piece 146 is relatively broad in radial dimension. The function of the teeth 122a, 124a is subsequently described.

A ferrofluid, described earlier with reference to the previous embodiments and referenced by a concentration of particles 46, fills each of the regions between the pole piece 146 and the teeth 122a, 124a as though it were a liquid O-ring or liquid lip-ring seal, for the reasons subsequently described. In this manner, the ferrofluid functions as an inclusion or exclusion seal, in the same manner as previously described.

It is understood that the shafts 122, 124 and the pole piece 222 are magnetically permeable so that in conjunction with the magnet disc 130, a magnetic circuit is established in the assembly 120. The magnetic circuit is represented by the flux lines 148 and establishes a concentrated magnetic field in the annular space between the shafts 122, 124 and the pole piece 146. The magnetic field strength, or magnetic flux density, is greatest in the narrow regions between the shafts 122, 124 and the pole piece 146. The concentrated magnetic field imposes body forces on the ferrofluid causing it to move to and occupy the areas of greatest flux density, i.e., the regions between the teeth 122a, 124a and the pole piece 146.

In operation, the clutch 50 and the seal assembly 120 function in a manner substantially the same as that previously described with reference to FIGS. 2 and 3.

The described torque transmission and conversion devices employing features of the present invention may be used for a wide variety of applications and are representative embodiments only. A latitude of modification, change and substitution is therefore intended in the foregoing disclosure and in some instances, some features of the invention will be employed without a corresponding use of other features.

For example, electrophoretic fluid torque transmission devices utilizing electrophoretic fluids are contemplated which employ features of the present invention. Variations in the electrode configuration are also contemplated.

Accordingly, it is appropriate that the appended claims be construed broadly and in a manner consistent with the scope of the invention.

What is claimed is:

1. Apparatus for controlling the transmission of force, said apparatus comprising first and second members adapted for relative movement, said first member defining a chamber and having a circular opening, said second member extending within said chamber in a spaced relation to said first member, an electroactive fluid disposed in the space between said members, a shaft extending from said second member and through said opening, the diameter of said shaft being less than the diameter of said opening to define an annular space, means for applying an electric field between said members and to said fluid for transmitting forces between said members by said fluid according to the strength of said electric field, a ferrofluid disposed in said annular space and immiscible with said electroactive fluid, and magnetic circuit means for applying a concentrated magnetic field in said annular space and to said ferrofluid to maintain said ferrofluid in said annular space as a seal.

2. The apparatus according to claim 1 wherein said electroactive fluid includes a perfluorinated polyether liquid phase.

3. The apparatus according to claim 1 wherein said ferrofluid includes a diester liquid phase.

4. The apparatus according to claim 1 wherein said ferrofluid includes a perfluorinated polyether liquid phase.

5. The apparatus according to claim 1 wherein said electroactive fluid includes a diester liquid phase.

6. The apparatus according to claim 1 wherein said electroactive fluid includes a polydimethylsiloxane liquid phase and said ferrofluid includes a perfluorinated polyether liquid phase.

7. The apparatus according to claim 1 wherein said electroactive fluid is an electrorheological fluid.

8. The apparatus according to claim 1 wherein said electroactive fluid is an electrophoretic fluid.

9. The apparatus according to claim 1 wherein said opening is beveled to have a relatively decreasing diameter away from said chamber for producing a gradient in the shear stress experienced by said fluid in said opening to force the particulate phase of said fluid away form said seal means.

10. The apparatus according to claim 1 wherein said second member includes a tapered end for preventing said fluid from experiencing relatively low shear stress in said chamber adjacent to said opening to prevent the particulate phase of said fluid from collecting near said opening.

11. The apparatus according to claim 1 wherein said magnetic circuit means comprises said shaft and at least one annular permanent magnet encircling said shaft.

12. The apparatus according to claim 11 wherein said circuit means further comprises at least one annular pole piece positioned in proximity to said magnet.

13. The apparatus according to claim 12 wherein said at least one pole piece includes axially-spaced, annular teeth along the inner diameter thereof for radially narrowing said annular space and providing corresponding ferrofluid seals between said teeth and said shaft.

14. The apparatus according to claim 13 wherein said spaces between said seals are pressurized.

15. The apparatus according to claim 12 wherein said shaft includes axially-spaced, annular teeth along the outer diameter thereof for providing corresponding ferrofluid seals between said pole piece and said shaft.

16. Apparatus for controlling the transmission of torque, said apparatus comprising a housing defining a chamber and having at least one circular opening, first and second members extending within said chamber in a spaced relation and adapted for relative movement, an electroactive fluid disposed within said chamber, a shaft extending from at least one of said members and through said opening, the diameter of said shaft being less than the diameter of said opening to define an annular space, means for applying an electric field between said members and to said fluid for transmitting torque between said members by said fluid according to the strength of said electric field, a ferrofluid disposed in said annular space and immiscible with said electroactive fluid, and magnetic circuit means for applying a concentrated magnetic field in said annular space and to said ferrofluid to maintain said ferrofluid in said annular space as a seal.

17. The apparatus according to claim 16 wherein said opening is beveled to have a relatively decreasing diameter away from said chamber for producing a gradient in the shear stress experienced by said fluid in said opening to force said fluid particulate phase away from said seal means.

18. The apparatus according to claim 16 wherein at least one of said members includes a end tapered radially outwardly from said shaft for preventing said fluid from experiencing relatively low shear stress in said chamber adjacent to said opening to prevent said fluid particulate phase from collecting near said opening.

19. The apparatus according to claim 16 wherein one of said members comprises a tube extending along the inner surface of said housing.

20. The apparatus according to claim 16 wherein said magnetic circuit means comprises said shaft, an annular permanent magnet fixed relative to said housing and encircling said shaft, and at least one annular pole piece fixed relative to said end adjacent to said magnet and encircling said shaft, wherein said concentrated magnetic field is provided in said annular space between said shaft and said at least one pole piece.

21. The apparatus according to claim 20 wherein the inner diameter of said pole piece includes axially-spaced, annular teeth for providing said annular space with corresponding axially-spaced, ferrofluid seals.

22. The apparatus according to claim 16 wherein said shaft is divided into first and second sections by a magnetic disc and a sleeve provided over said disc for joining said sections.

23. The apparatus according to claim 22 wherein said magnetic circuit means comprises said shaft, said disc, and a tubular pole piece fixed relative to said housing and encircling said shaft in a spaced relationship therefrom, wherein said concentrated magnetic field is provided between said shaft and said pole piece.

24. The apparatus according to claim 23 wherein said shaft includes axially-spaced annular teeth for providing said annular space with corresponding spaced ones of said ferrofluid seals.

* * * * *

UNITED STATES PATENT AND TRADEMARK OFFICE
CERTIFICATE OF CORRECTION

PATENT NO. : 5,007,513
DATED : April 16, 1991
INVENTOR(S) : J. David Carlson

It is certified that error appears in the above-identified patent and that said Letters Patent is hereby corrected as shown below:

Col. 1, line 45, change "particle deficient" to --particle-deficient--.

Col. 2, line 38, change "Bingham type" to --Bingham-type--.

Col. 3, line 12, change "&he" to --the--.

Col. 5, line 2, change "leak proof" to --leak-proof--.

Col. 5, line 28, change "press fit" to --press-fit--.

Col. 6, line 16, change "flu lines" to --flux lines--.

Col. 7, line 44, change "52 thus" to --52, thus--.

Col. 10, lines 34 and 35, change "run out" to --run-out--.

UNITED STATES PATENT AND TRADEMARK OFFICE
CERTIFICATE OF CORRECTION

PATENT NO. : 5,007,513
DATED : April 16, 1991
INVENTOR(S) : J. David Carlson

It is certified that error appears in the above-identified patent and that said Letters Patent is hereby corrected as shown below:

Column 14, line 18, change "a end" to --an end--.

Signed and Sealed this

Twenty-seventh Day of October, 1992

Attest:

DOUGLAS B. COMER

Attesting Officer     Acting Commissioner of Patents and Trademarks